United States Patent Office 2,721,824
Patented Oct. 25, 1955

2,721,824

SOLUBILIZATION OF COPPER-8-QUINOLINOLATE

Robert Feigin and Morris P. Schwartz, Providence, R. I., assignors to Geigy Chemical Corporation, a corporation of Delaware No Drawing. Application August 1, 1952,
Serial No. 302,227

5 Claims. (Cl. 167—33)

This invention relates to the solubilization of copper-8-quinolinolate to form a concentrated solution thereof which is soluble in Stoddard solvent, mineral spirits or other commonly employed volatile organic solvents, particularly those used in textile treatments, to confer water repellency as well as fungicidal and fungistatic properties to the treated material. This invention also relates to the concentrate per se secured by the solubilization of copper-8-quinolinolate, which concentrate possesses the aforesaid properties when diluted by these relatively low cost volatile organic liquid solvents, even at the dilutions of the order of 1%.

8-hydroxy-quinoline, also known as oxine, forms water-insoluble complexes or chelates with many metals. The copper derivative, formed by the combination of a single mol of copper, and 2 mols of 8-hydroxy-quinoline, is one of the most insoluble, but nevertheless one of the most important of these. It has the following structural formula:

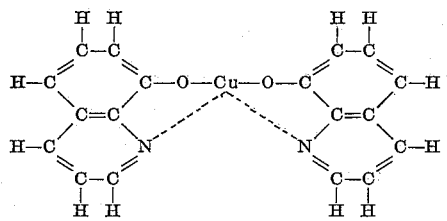

Copper-8-quinolinolate is known and recognized as one of the most effective fungicidal compounds. It is of great value, therefore as a preservative and mildewproofing agent for cotton, wool, synthetic fibers of all types, wood, concrete and plastics. Because of its insolubility, its application to such materials has been largely restricted to coarse dispersions in both water and non-aqueous solvents. Under such conditions the applications are often non-uniform, non-penetrating, and susceptible to leaching after application.

It has been proposed to react a water-insoluble heavy metal soap of higher fatty acids, such as zinc, nickel soap or aluminum soap with copper-8-quinolinolate at such temperatures as 400–430° F. until a homogeneous composition has been formed, i. e., the copper-8-quinolinolate has gone into solution (U. S. Patents Nos. 2,561,379 and 2,561,380).

Applicants have previously found out that copper-8-quinolinolate could be dissolved to form a concentrated solution in an acid ester (sometimes termed the hydrogen ester of a polycarboxylic acid) ester of an organic poly-carboxylic acid, which ester has one free carboxylic acid group and one esterified carboxylic acid group and is polar in nature; and this concentrate is soluble in volatile, liquid organic solvents conventionally employed for uses specified herein. This invention herein is an improvement over this prior invention set forth in application Serial No. 274,312, filed February 29, 1952, in that several desirable properties are conferred to the concentrates and the dilute solutions made from the concentrated solutions, as it will now become apparent from the purposes which are herewith briefly, yet concisely recited.

It is an object of the present invention to prepare concentrated solutions of copper-8-quinolinolate which concentrates are capable of dilution in volatile, aliphatic hydrocarbon and aromatic hydrocarbon solvents, such as Stoddard solvent,[1] mineral spirits, and other conventionally employed liquid organic solvents, to secure dilute solutions for imparting water repellency to textile as well as fungicidal and fungistatic properties thereto. The concentrates of copper-8-quinolinolate in acid esters of organic poly-carboxylic acids do not possess this water-repellent property.

It is also an object to prepare concentrated solutions of copper-8-quinolinolate whose tendency toward crystallization is so inhibited that they do not crystallize immediately or upon storage. Such acid esters of dicarboxylic acids as mono-stearyl acid phthalate and tri-methylenecyclohexyl acid phthalate possess a strong tendency to crystallize, and therefore, on cooling and on storage the solubilized copper-8-quinolinolate also will crystallize. So the concentrated solutions of this latter compound formed according to the present invention whereby this tendency is inhibited have another advantage.

These and other objects become apparent from reading the following description of the invention.

According to the present invention it has been found that copper-8-quinolinolate can be dissolved to form concentrated solutions capable of dilution with volatile, liquid hydrocarbon solvents, including the aliphatic type, by heating it with an acid ester of certain di- and tri-carboxylic acids which have been completely or partially neutralized or reacted with a metallic neutralizing radical from the group consisting of zinc, cobalt, nickel and copper. The neutralized ester is more polar and less lipophilic than the corresponding polar acid or hydrogen ester before the heavy metal salt of this ester is formed. It is preferred to neutralize or react the acid ester with basic zinc compounds, more particularly zinc oxide, because color is not introduced and there is ease of reaction and low cost of the reactant. Chemically the neutralized compounds can be designated as metallic salts of the acid or hydrogen ester of a dicarboxylic or tricarboxylic acid, wherein the metallic radical is Zn, Co, Ni or Cu.

The presence of this metallic radical confers greater polarity to the aforesaid concentrated solution than the corresponding un-neutralized acid or hydrogen ester possesses. This is the belief in explanation of some observed phenomena or behavior. Aliphatic hydrocarbon type volatile, liquid solvents are recognized generally as among the poorest solvents for the concentrated solutions of copper-8-quinolinolate. The Zn-, Co-, Ni-, or Cu-salt of these acid esters of polycarboxylic acids enhance the solubility in mineral spirits, Stoddard solvent and other volatile hydrocarbon solvents, solely or predominantly of the aliphatic type, when the solubilizers and copper-8-quinolinolate would otherwise crystallize. Moreover, the dilute solutions in aliphatic or aromatic hydrocarbon (or mixed) liquid solvents of this concentrated solution, as of the order of 1% or greater of copper-8-quinolinolate, aid in imparting water repellency to textiles and other materials. The incorporation of paraffin or other waxes can

---

[1] Stoddard solvent is defined in publication Commercial Standards #3–40 published by the Commodity Standards Section of the U. S. Department of Commerce. This petroleum solvent is defined as an aliphatic hydrocarbon solvent in which the constituents are branched chain saturated aliphatic hydrocarbons in which the number of carbon atoms range from 5 to 10. This solvent can also be characterized by having a boiling point between 50° to 125° C. or any fraction thereof.

in addition be utilized to increase this latter designated property.

The alcohol radical of the ester which is formed from a fatty alcohol is preferred, both to secure water-repellency and solubility in aliphatic type solvents. As mentioned specifically at other places in the description of this invention, stearyl alcohol, lauryl alcohol, which alcohols correspond to the higher fatty acids stearic acid and lauric acid known to be present as esters in fatty oils and fats, and cetyl alcohol present in combined form as the alcohol portion in waxes, may be used, as well as the synthetic alcohols p-octyl-phenoxy-ethanol, ethylene glycol p-sec-butylphenyl ether, which last two contain an aromatic ring. The term "fatty alcohol" is recognized as denoting primary alcohols derived from natural fats and oils or their fatty acids by reduction and from waxes (chemical designation) by saponification.

In the formation of the concentrated solution itself of copper-8-quinolinolate in the metallic (Zn, Co, Ni or Cu) salt of the acid ester of the di- or tri-carboxylic acid, the solubilizing action is enhanced if there is present in the chemical structure of the solubilizer an aromatic nucleus, or a free hydroxy group alpha or beta to the carboxyl group or preferably both. The ester linkage —COOR— confers polarity, yet these two designated groups increase the polarity which is correlated to the greater solubilizing potentiality for the copper-8-quinolinolate in the concentrated solution.

The presence of the metallic radical in the solubilizer frequently inhibits the crystallization of the solubilized concentrate immediately or on storage, since some acid ester solubilizers are crystalline in nature.

The use of the zinc, cobalt, nickel, or copper salt of the polar, acid ester of the polycarboxylic acid permits greater latitude in formulation than the unneutralized polar, acid esters of the polycarboxylic acids would afford alone.

Whereas one of the major objects of the present invention is to employ a solubilizer for the copper-8-quinolinolate which secures a concentrate soluble in aliphatic type solvents such as mineral spirits or Stoddard solvent, it should be understood that other common liquid solvents including xylol, pine oil, turpentine, chlorinated solvents such as carbon tetrachloride, perchlorethylene, and o-dichlorobenzene, or ethyl acetate, butyl acetate, lacquer thinners, paint solvents, and other low cost solvents can be employed in formulating the dilute solutions for uses mentioned previously and other uses. This does not mean, however, that there is universal solubility of the various concentrated solutions of copper-8-quinolinolate therein; the solubility of the aforementioned solubilizer in the liquid diluents is a factor. It is desirable to have concentrated solutions that are readily soluble on dilution at, or slightly above, room temperature.

The acid ester, of which the neutralized or reacted ester is the solubilizer of the present invention, must be soluble in the diluent or solvent for compounding the fabric-treating solution or coating liquid. Likewise the zinc, cobalt nickel or copper salt thereof should be soluble therein. We have found that lauryl alcohol (technical grade), which alcohol has 12 carbon atoms, esterified with phthalic or maleic acid represents the lowest molecular weight materials that are soluble in liquid aliphatic hydrocarbons; for aromatic solvents and pine oil, lower molecular weight aliphatic and aromatic alcohols could be used. If the di-carboxylic acid is one of the longer chain length than maleic or phthalic acids, such as sebacic acid, the alcohol radical can be shorter than 12 carbon atoms.

It must be remembered that the effect of the metal is to increase the polarity of any selected acidic partial ester, which may increase the solubility of copper-8-quinolinolate where the potential solubilizer thereof is otherwise too high in molecular weight or too lipophilic. If the solubilizer is well balanced and has a relatively low molecular weight the increased polarity introduced by the metal may decrease the solubility of the concentrate in the liquid hydrocarbon solvents. Therefore, it is a question of preparing the solubilizer and hence the metallic derivation so that it will have the desired solvent solubility, i. e., in the diluent for forming the dilute solution, from the concentrate. The term "solubilizer" refers to the concentrated solution, not the dilute solution used in the industrial applications.

Various polycarboxylic acids which are di- and tri-carboxylic acids can be employed. A partial list is maleic, succinic, adipic, aconitic, itaconic, tri-carballylic, dilinoleic, sebacic, diglycollic, citric, phthalic and methylene di-salicylic acids. These come under the classification of: (1) unsaturated aliphatic di-carboxylic acids, illustrative of which are maleic and dilinoleic acids; (2) saturated aliphatic di-carboxylic acids, illustrative of which are succinic, adipic, sebacic, itaconic and diglycollic acids; (3) unsaturated aliphatic tri-carboxylic acids, illustrative of which is aconitic acid; (4) saturated aliphatic tri-carboxylic acids, illustrative of which are tricarballylic acid and citric acids; and (5) aromatic dicarboxylic acids, illustrative of which are phthalic acid and methylene di-salicylic acid. Anhydrides of the dicarboxylic acids in the above disclosure, under the conditions of reaction to be described, give products which are identical with those obtained by the utilization of the acids themselves.

There are several precautions which should be taken for securing satisfactory concentrates in accordance with this invention. It is desired to avoid either reduction of the copper compound to copper, or the oxidation of organic matter. An atmosphere of carbon dioxide, nitrogen or other inert gas can be used to prevent the oxidation of organic matter which is accompanied by reduction of the copper in the chemically bound condition to the metallic state, but this was not found necessary, since the incorporation of metals, more particularly zinc reduces the sensitivity toward oxidation. Chemical anti-oxidants may also be incorporated if desired.

In view of the fact that copper in the compound is easily reduced and the 8-hydroxy-quinoline is oxidized, it is desirable to avoid the use of any oxidizing or reducing ingredients in the composition, either in the concentrated solution or the diluted solution, commercially usable particularly as sprays or impregnants. Whereas the time of preparation of the concentrated solution in the laboratory is often of short duration, in actual commercial production because the batches are large, times of heating are necessarily longer; and therefore, chemical oxidants and reductants have a greater effect.

Various methods or techniques may be employed for forming the concentrated solution of copper-8-quinolinolate in the metallic salt of the acidic partial ester of the polycarboxylic acid. The preferred method of solubilization is to disperse the copper-8-quinolinolate in the alcohol, together with the inorganic metallic salt of zinc, cobalt, nickel or copper, adding all of the polybasic carboxylic acid at once. This mixture is heated until an exothermic reaction occurs. Heating is resumed when this reaction subsides and continued until all of the copper-8-quinolinolate dissolves. By this means concentrated solutions can be prepared at 130–160° C. instead of at 200–220° C. Also, instead of using copper-8-quinolinolate, it may be prepared in situ from 8-hydroxy-quinoline and a copper salt.

The solubilization of copper-8-quinolinolate in the metallic salt of the acid ester of dicarboxylic or tricarboxylic acid is greatly dependent upon mechanical factors such as the degree of agitation and the rate of addition of the acid components. Sufficiently vigorous agitation must be employed during the preparation of this concentrated solution that strong shearing action is imparted, so that there is little or no build-up in viscosity of the mixture. Care must be exercised in the formation of the metallic derivatives of the acid esters, which undoubtedly are colloidal in their nature. For otherwise, the copper- 8-quinolinolate may not be properly solubilized. The other important factor is the rate of addition of the organic acid or its acid anhydride where this is the last reactant introduced into the mixture. If this material is not added rapidly the subsequent reaction with the metallic oxide or basic metallic salt may not be complete and the subsequent solubilization of the copper-8-quinolinolate will also be incomplete. From this discussion it can be perceived that the acid esters of polycarboxylic acids of our application, Ser. No. 274,312, filed February 29, 1952, are more easily compounded than the metallic derivatives (Zn, Co, Ni and Cu) employed in the present invention.

It is not necessary to employ pure chemical compounds or compositions to solubilize copper-8-quinolinolate. Moreover as mentioned previously, the reaction or neutralization of the polar, acid or hydrogen ester of the di- or tri-carboxylic acid to form the metallic salt (Zn, Co, Ni or Cu) may be complete or partial. When the polycarboxylic acid is a dicarboxylic acid, as is customarily chosen, then the metallic salt is of acid or hydrogen mono ester. Mixtures of various types such as mixed esters having two or more alcohol radicals or carboxylic acid radicals may also be used.

The techniques employed in esterification and in salt formation of the acid ester are both well known and varied. Insofar as these two unit processes per se are concerned we generally employ conventional or known methods. We recognize that the use of a catalyst, an azeotropic fluid, reduced pressure or special mechanical equipment to facilitate or promote esterification has been utilized both in laboratory and plant operation. But there should be avoided the use of those chemicals and conditions that chemically alter the components. Copper in the copper-8-quinolinolate is easily reduced to the metallic state and 8-hydroxyquinoline just as easily oxidized. The polar, acid ester can be prepared with a very powerful catalyst and/or under reduced pressure, wherein the reaction temperature is too low at that stage to dissolve copper-8-quinolinolate; but it can be brought into solution at another or subsequent state.

The following examples set forth specific embodiments of the invention but are not to be construed as limiting the same. In the examples where the term "parts" appears, this refers to parts by weight.

EXAMPLE 1

39 parts of commercial stearyl alcohol and 21 parts of phthalic anhydride were heated together to 165° C. 10 parts of copper-8-quinolinolate were added, and the mixture heated further to 210° C. Most of the copper-8-quinolinolate dissolved. 9.55 parts of technical zinc carbonate (55.0% ZnO) were then added slowly, and the reaction mixture heated further at 215° C.±5° C. until a completely clear black solution resulted. A good degree of agitation was employed throughout. The solution was cooled to 125° C. and 10 parts of paraffin wax were added. At 100° C., 15 parts of Stoddard solvent were added, and the mixture was then further cooled.

The copper-8-quinolinolate concentrate in the zinc salt of mono-stearyl phthalate made in this manner was soluble on dilution in Stoddard solvent and xylol.

EXAMPLE 2

39 parts of commercial stearyl alcohol and 21 parts of phthalic anhydride were heated together to 165° C. 10 parts of copper-8-quinolinolate were added, and the mixture heated further to 210° C. to dissolve most of the copper-8-quinolinolate. 5.25 parts of ZnO were then added, and the reaction mixture heated further at 215°±5° C. until a completely clear black solution resulted. A good degree of agitation was employed throughout. The solution was cooled to 125° C., and 10 parts of paraffin wax and 15 parts of Stoddard solvent added to thin out the composition. The concentrated solution of copper-8-quinolinolate in the zinc salt of mono-stearyl phthalate made in this manner was soluble on dilution in Stoddard solvent and xylol.

When applied from a solution in mineral spirits to cotton webbing and 12 ounce cotton duck so that 1% of the fungicide was impregnated, there was no appearance on the fabric of mildew after soil burial for two weeks and no loss of tensile strength. The dynamic absorption of water was determined according to Federal Specification CCC-T-191b, Method 5500 was 14.0% as compared to 47.2% for the untreated webbing. The standard spray rating, according to Method 5526 of the Federal Specification was 90-100 on the cotton duck and zero for the untreated.

EXAMPLE 3

39 parts of commercial stearyl alcohol and 10 parts of copper-8-quinolinolate were heated together to 100° C. 5.25 parts of ZnO were added and this mixture heated to 105° C. 21.0 parts of phthalic anhydride were added rapidly accompanied by an exothermic reaction. The mixture was heated at 160°±5° C. until all of the copper-8-quinolinolate dissolved to give a clear black solution. A good degree of agitation was employed throughout.

The concentrated copper-8-quinolinolate product was soluble on dilution in Stoddard solvent and xylol, also chlorinated solvents including carbon tetrachloride or perchlorethylene.

In the subsequent three examples, namely 4, 5, and 7 the "A" part represents the employment of the polar, acid partial ester solubilizer, the type embraced in patent application, Serial No. 274,312 filed February 29, 1952, of the same applicants, whereas the "B" part is of the type of the present invention.

EXAMPLE 4

Part A 25.4 parts of maleic anhydride and 64.6 parts of p-octyl-phenoxy-ethanol were heated to 170° C. 10 parts of copper-8-quinolinolate were added and the mixture was then heated to 180° C. To obtain a clear black solution, this was soluble on dilution in Stoddard solvent and xylol.

Part B 43.1 parts of p-octyl-phenoxy-ethanol and 10 parts of copper-8-quinolinolate were heated together to 100° C.; 5.8 parts of ZnO were then added and this mixture was heated to 105° C. 16.9 parts of maleic anhydride were then rapidly added, accompanied by an exothermic reaction. The resultant mixture was then heated to 160°±5° C. until a clear black solution resulted. During all these steps the agitation was vigorous. The temperature was reduced to 125° C., and 25.0 parts of Stoddard solvent were added.

The copper-8-quinolinolate concentrate was soluble on dilution in Stoddard solvent and xylol.

EXAMPLE 5

Part A 56.5 parts of p-octyl-phenoxy-ethanol and 33.5 parts of phthalic anhydride were heated to 170° C. 10.0 parts of copper-8-quinolinolate were added and this mixture was heated to 180° C. There was obtained a clear black concentrate. This concentrate was soluble on dilution in xylol.

Part B 53.4 parts of p-octyl-phenoxy-ethanol and 10.0 parts of copper-8-quinolinolate were heated to 100° C. 5.8 parts ZnO were added and the mixture heated to 105° C. 31.6 parts phthalic anhydride were rapidly added, accompanied by an exothermic reaction. The reaction mixture was heated to 160°±5° C. to obtain a clear black concentrate. During all these steps the agitation was vigorous. This was soluble on dilution in Stoddard solvent and xylol.

EXAMPLE 6

53.4 parts of p-octyl-phenoxy-ethanol and 10.0 parts of copper-8-quinolinolate were heated to 100° C. 8.25 parts of the basic copper carbonate (55.0% Cu) were added and mixture heated to 105° C. 31.6 parts of phthalic anhydride were rapidly added, accompanied by an exothermic reaction. The reaction mixture was then heated at 160°±5° C. to obtain a clear black liquid concentrate. Agitation of the kind to which reference has previously been made was employed during all these steps. This was soluble upon dilution in Stoddard solvent and xylol.

EXAMPLE 7

Part A 30.2 parts of maleic anhydride and 59.8 parts of ethylene glycol p-sec-butylphenyl ether were heated to 170° C. 10 parts copper-8-quinolinolate were added and the reaction mixture was heated at 160°±5° C. until a clear black concentrate resulted. The concentrate was soluble upon dilution in Stoddard solvent and xylol.

Part B 46.7 parts of ethylene glycol p-sec-butylphenyl ether and 10.0 parts of copper-8-quinolinolate were heated to 100° C. 5.8 parts of ZnO were added and this mixture was heated to 105° C. 23.5 parts maleic anhydride were added accompanied by an exothermic reaction. The reaction mixture was then heated at 160°±5° C. until it became completely clear and black. 15 parts Stoddard solvent were added at 125° C. and concentrate was cooled. The precautions as to stirring and anhydride addition were observed. The concentrated copper-8-quinolinolate was soluble upon dilution in xylol.

EXAMPLE 8

62.6 parts of commercial stearyl alcohol was melted at 100° C., 10 parts of copper-8-quinolinolate and 5.8 parts of ZnO were added, and the mixture heated to 105° C. 22.4 parts of maleic anhydride were added quickly, followed by an exothermic reaction. Upon heating to 160° C.±5° C., a clear black concentrated solution of copper-8-quinolinolate resulted. The precautions as to stirring and the addition of anhydride were observed. This was dilutable in Stoddard solvent and xylol.

This composition also imparted excellent water repellency as well as mildew resistance when applied to cotton fabrics.

As was stressed at the outset one of the primary uses of the dilute solutions of copper-8-quinolinolate is in the field of textile treatment to confer fungicidal and fungistatic properties and water repellency. For these treatments the common volatile solvents, such as Stoddard solvent, mineral spirits, carbon tetrachloride and perchlorethylene are usually employed. But the fungicidal compositions consisting of the concentrated solutions in the neutralized hydrogen esters can be incorporated in paints and other coating compositions where the solvent is not in this limited list but may be turpentine, pine oil, or fatty or mineral drying oils, or lacquer solvents, such as the lower boiling point esters, etc. In short, the solvent can be of various chemical types, and either volatile or non-volatile.

The degree of water repellency, measured by tests, is better in the case of the dilute solutions of copper-8-quinolinolate solubilized as previously disclosed in the metallic (Zn, Co, Ni or Cu) salts mentioned, than in the corresponding unneutralized acid mono esters of dicarboxylic acids. The neutralized stearyl alcohol esters are best suited for obtaining water repellency. Cetyl alcohol esters can be used.

Although we have described in detail only certain preferred yet representative embodiments of the present invention which have been prepared, it will be apparent to those skilled in the art that it is not so limited. Hence we do not intend to be limited except by the scope of the appended claims taken in conjunction with the entire disclosure.

We claim as our invention:

1. A concentrated solution of copper-8-quinolinolate in a zinc salt of an acid ester, the acid radical of which is a member of the group consisting of phthalic acid and maleic acid, and the alcohol radical which is a paraffin alcohol having 12 to 18 carbon atoms, inclusive, which concentrated solution is soluble upon dilution in mineral spirits, an aliphatic hydrocarbon solvent whose carbon atoms range from 5 to 10 and B. P. 50–125° C., xylol and volatile chlorinated hydrocarbon solvents.

2. A concentrated solution of copper-8-quinolinolate in a metallic salt of an acid ester, the metallic radical of which is a member of the group consisting of zinc, cobalt, nickel and copper, the acid radical of which is a member of the group consisting of phthalic acid and maleic acid, and the alcohol radical which is a paraffin alcohol having 12 to 18 carbon atoms, inclusive, which concentrated solution is soluble upon dilution in mineral spirits, an aliphatic hydrocarbon solvent whose carbon atoms range from 5 to 10 and B. P. 50–125° C., xylol and volatile chlorinated hydrocarbon solvents.

3. The method of solublizing copper-8-quinolinolate consisting of heating it with the zinc salt of the acid or hydrogen ester of stearyl phthalate under thorough agitation until a dark concentrated solution results, which solution is soluble in mineral spirits, an aliphatic hydrocarbon solvent whose carbon atoms range from 5 to 10 and B. P. 50–125° C., xylol and volatile chlorinated hydrocarbon solvents.

4. A concentrated solution of copper-8-quinolinolate in a zinc salt of the acid ester of stearyl phthalate, which concentrated solution is soluble upon dilution in mineral spirits, an aliphatic hydrocarbon solvent whose carbon atoms range from 5 to 10 and B. P. 50–125° C., xylol and volatile chlorinated hydrocarbon solvents.

5. A fungicidal and/or fungistatic composition capable of imparting water repellency to textiles consisting of a dilute solution in a liquid organic solvent of copper-8-quinolinolate dissolved in a zinc salt of the acid ester of stearyl phthalate.

References Cited in the file of this patent

UNITED STATES PATENTS

| | | |
|---|---|---|
| 2,561,379 | Kalberg | July 24, 1951 |
| 2,561,380 | Kalberg | July 24, 1951 |
| 2,561,553 | Ashford | July 24, 1951 |